(12) United States Patent
Brcka (10) Patent No.: US 8,103,492 B2
(45) Date of Patent: Jan. 24, 2012

(54) PLASMA FLUID MODELING WITH TRANSIENT TO STOCHASTIC TRANSFORMATION

(75) Inventor: Jozef Brcka, Loundonville, NY (US)

(73) Assignee: Tokyo Electron Limited, Tokyo (JP)

( * ) Notice: Subject to any disclaimer, the term of this patent is extended or adjusted under 35 U.S.C. 154(b) by 592 days.

(21) Appl. No.: 12/248,554

(22) Filed: Oct. 9, 2008

(65) Prior Publication Data

US 2010/0063787 A1 Mar. 11, 2010

Related U.S. Application Data

(60) Provisional application No. 61/094,719, filed on Sep. 5, 2008.

(51) Int. Cl.
G06G 7/48 (2006.01)
G06F 19/00 (2011.01)

(52) U.S. Cl. .............................................. 703/6; 700/95

(58) Field of Classification Search ......... 703/6; 700/95
See application file for complete search history.

(56) References Cited

U.S. PATENT DOCUMENTS

| | | | |
|---|---|---|---|
| 5,997,962 A | 12/1999 | Ogasawara et al. | |
| 6,426,477 B1 | 7/2002 | Koshimizu et al. | |
| 6,523,493 B1 | 2/2003 | Brcka | |
| 6,576,860 B2 | 6/2003 | Koshimizu et al. | |
| 7,139,632 B2 | 11/2006 | Cooperberg et al. | |
| 7,273,533 B2 | 9/2007 | Brcka et al. | |
| 2002/0133326 A1 | 9/2002 | Chung et al. | |
| 2005/0160985 A1 | 7/2005 | Brcka | |
| 2005/0217797 A1 | 10/2005 | Jafarian-Tehrani | |
| 2007/0020937 A1* | 1/2007 | Chen et al. ................... 438/689 |
| 2007/0118341 A1* | 5/2007 | Tamaoki et al. ................. 703/2 |

OTHER PUBLICATIONS

Jae Koo Lee, Non Patent Publication, "Simulation of Capacitively Coupled Singe- and Dual-Frequency RF Discharges", Feb. 2004.*
Takashi Yagisawa, Non Patent Publication, "Prediction of a Radial Variation of Plasma Structure and Ion Distributions in the Wafer Interface in Two-Frequency Capacitively Coupled Plasma", Feb. 2004.*
Tran Duong Hien, Non Patent Publication, "Stochastic finite element modeling in linear transient heat transfer", 1997.*
T. Yagisawa, Non Patent Publication, "Modeling of radial uniformity at a wafer interface in a 2f-CCP for SiO2 etching", Sep. 2005.*
Insook Lee, D B Graves and M A Lieberman, "Modeling electromagnetic effects in capacitive discharges", Plasma Sources Feb. 2008.*
J Schulze, T Gans, D O'Connell, and U Czarnetzki, "Space and phase resolved plasma parameters in an industrial dual-frequency capacitively coupled radio-frequency discharge", Nov. 2007.*
T Gans, J, Schulze, "Frequency coupling in dual frequency capacitively coupled radio-frequency plasmas", Dec. 2006.*

(Continued)

Primary Examiner — David Silver
Assistant Examiner — Angel Calle
(74) Attorney, Agent, or Firm — Wood, Herron & Evans, LLP (57) ABSTRACT

The invention relates to the simulation method and apparatus used in plasma modeling. It includes a method to transform transient formulations of the phenomenological plasma model into a quasi-stochastic spatial formulation. Specifically, the invention aids in decreasing computational time for the modeling of plasma in a plasma processing system, particularly those involving two different time-based parameters. The invention is particularly described in connection with plasma simulations used for the optimization dual-frequency capacitively-coupled plasma etching systems.

24 Claims, 6 Drawing Sheets

OTHER PUBLICATIONS

Cale T.S, et al. "Thin Films vol. 22: Modeling of film deposition for microelectronic applications," Eds. Rossnagel S. and Ulman, A. Academic Press, San Diego (1996), p. 176-271.

Denpoh K., et al., "Sheath model for dual-frequency capacitviley coupled plasmas," Japanese Journal of Applied Physics, (2004) 43(8A):5533-5539.

Hebner G.A., et al., "Frequency dependent plasma characteristics in a capacitively coupled 300 mm wafer plasma processing chamber," Plasma Sources Sci. Technol., 15, 879-888 (2006).

Mussenbrock T., et al., "Skin effect in a small symmetrically driven capacitive discharge," Plasma Sources Sci. Technol., 17, 1-7 (2008).

Robson R.E., et al., "Kinetic theoretical and fluid modeling of plasmas and swarms: the big picture," Plasma Sources Sci. Technol. 17, 1-7 (2008).

Kawamura, et al., "Capacitive discharges driven by combined dc/rf sources," J. Vac. Sci. Technol. A25(5) 1456-1474 (2007).

Lisovskiy V., et al., "Modes of low-pressure dual-frequency (27/2 MHz) discharges in hydrogen," Plasma Sources Sci. Technol., 17, 1-6 (2008).

Lee, "Modeling electromagnetic effects in capacitive discharges," Plasma Sources Sci. Technol., 17 (2008), 1-16.

* cited by examiner

FIG. 7 ns (or 1 μs) time scales. The computational time is related to the product of the number of iterations that each solution requires.

PLASMA FLUID MODELING WITH TRANSIENT TO STOCHASTIC TRANSFORMATION

CROSS-REFERENCE TO RELATED APPLICATIONS

This application claims the benefit of U.S. Provisional Application Ser. No. 61/094,719, filed on Sep. 5, 2008, the disclosure of which is hereby incorporated by reference herein in its entirety.

FIELD OF THE INVENTION

The invention relates to the modeling of plasma distribution properties in the design and optimization of plasma processing systems. More particularly, the invention relates to a system and a method for modeling the distribution within the chamber of a plasma processing system, of plasma density, plasma species, or other plasma properties. The invention is particularly useful in the design and optimization of dual-frequency CCP etching systems, IPVD deposition systems, and other plasma processing or plasma enhanced processing systems.

BACKGROUND

Advanced plasma tools have been using very high frequency power sources or combination radiofrequency (RF) and direct current (DC) power supplies to advance greater control over the plasma formation process and performance. Recently, for example, capacitively coupled plasma (CCP) reactors have employed dual frequency (DF) power delivery to control the energy and density of the ions and radicals at the surface of a wafer being processed. In such reactors, the effectiveness and the quality of the process being performed depends on the distributions of this energy and of the various particle species in the processing chamber, particularly near the wafer surface. Inductively coupled plasma (ICP) reactors, such as ionized physical vapor deposition (iPVD) reactors, employ combinations of gas and coating material species plus energy introduced from a number of different sources within the geometry of a processing chamber. In these systems, the material and energy distributions that affect the process being performed are reached after initial parameters are established, transient behavior has subsided, and the system has stabilized. However, the physics of this process has not been fully understood and has been the subject of continued theoretical and experimental investigations.

Plasma modeling and numerical simulations play in an important role in understanding plasma behavior in these systems. Modeling and simulation methods can play important roles in the development and optimization of plasma equipment and related plasma processes.

While, in the last decade, computing systems have greatly increased capabilities for numerically modeling complex and robust plasma-chemical systems like etching systems (for example central processing unit (CPU) speed, multi-core architecture, memory resources, and large size data storage capacities), the computational time required for a full numerical simulation is often on the scale of many hours, and in some specific complex cases, can be several days. Most computing systems and software are not yet ready and/or capable for parallel computing for a variety and specific tasks.

For example, even with the simplest plasma model, e.g. inert argon gas with a basic geometry etching system, a computer simulation of the plasma density distribution can take several hours (2-6 hours) to converge if the model includes mutually coupled mass transport equations, heat and energy balance equations, and electromagnetic (EM) wave propagation equations of 100 MHz (i.e. RF cycle on a 10 ns time scale). To generate a full transient solution on a system excited by a lower frequency EM wave would require yet longer CPU times.

Computational time becomes even longer when more complex chemistry (number of reactant species and/or number of participating reactions) and higher resolution reactor geometry are modeled. Computing time increases yet again if a transient solution is desired, when a pulsed process is investigated by simulation, or when a process is operating on multiple frequency scales, such as in the DF-CCP etching system. Multiple frequency scales or other multiple time based factors increase computational time because electron and ion transport properties within the plasma must be solved at both time scales. For example, the first frequency of the DF-CCP etching system can be 100 MHz (corresponding to a 10 ns time scale); and the second frequency can be 1-2 MHz (corresponding to a 1 μs time scale). Thus, the DF-CCP etching system must be solved for both the 10 ns and the 500 ns (or 1 μs) time scales. The computational time is related to the product of the number of iterations that each solution requires.

If the interactions between the ion flux and the processed wafer are considered, which can be over the time scale of several thousand RF cycles, the number of iterations and computational times can increase drastically.

Thus, there is a need to develop fast methods that would reduce computational real time in complex chemistry and geometry plasma systems. The fast algorithm and/or method could apply to solving numerically by finite elements modeling (FEM) methods, multiple frequency applications, pulsed plasma processes, sequential processing, contamination studies, feature profile evolutions, or developing industrial applications for etching or deposition technologies in plasmas.

Further, there is a need to develop and invent new, fast algorithms for technological plasma simulations and modeling. The simulation procedure should be practical and efficient for aiding in process and/or hardware development, for serving as an operational and predictive flexible tool, and for generating outputs as close as possible to the development needs and workflow in real time. Thousands of wafers are processed by the technological process on a daily basis, thus a large amount of experimental data related to hardware and software performance is readily available. Simulation procedures should be competitive in the rate of generating results to provide the ability to correlate, correct, or change the technological process in real time. This can represent large material and technical resource savings.

SUMMARY OF THE INVENTION

According to principles of the present invention, a computer method is provided for simulating plasma density distribution within a plasma reactor that is responsive to at least two variables of different time bases. The computer method includes executing computer program codes according to a process of approximating transient sheath behavior of the plasma occurring in the plasma reactor in response to a variable having a first time basis and performing, on a spatial character that is based upon the probability function, a time-domain simulation of the transient plasma sheath behavior occurring in the plasma reactor in response to a variable having a second time basis. The behavior is approximated by defining a model domain that is characteristic of the plasma reactor, constructing a probability function for a time dependent variable within the model domain, and transferring the time dependent variable into the spatial character. In certain embodiments, the performing is carried out to arrive at a steady state plasma density distribution.

According to an exemplary embodiment of the invention, a computer method is provided for simulating plasma density distribution within a capacitively coupled plasma reactor having a dual frequency power source coupled to the plasma, where transient sheath behavior of the plasma occurring in the plasma reactor at a first frequency of the dual frequency power source is approximated and a time-domain simulation of the transient plasma sheath behavior occurring in the plasma reactor is performed on the spatial character at a second frequency of the dual frequency power source.

In certain embodiments of the invention, the constructing includes random time sampling of the time dependent variable and constructing a probability function of a predetermined plasma parameter response to an incremental unit of a time dependent variable within the model domain. In some embodiments of the invention, the defining includes establishing at least one initial value and at least one boundary condition for the model domain.

A plasma reactor optimized in accordance with the simulation performed by the computer method of the invention is also provided. For example, a dual-frequency plasma etching reactor optimized in accordance with the simulation performed by the computer method of the invention is provided.

A computer program product is also provided having computer readable program codes embodied in the medium that when executed causes a computer to execute the method of the invention. A simulation apparatus is also provided having a calculating unit programmed with the computer program product.

DETAILED DESCRIPTION

Figure 1:
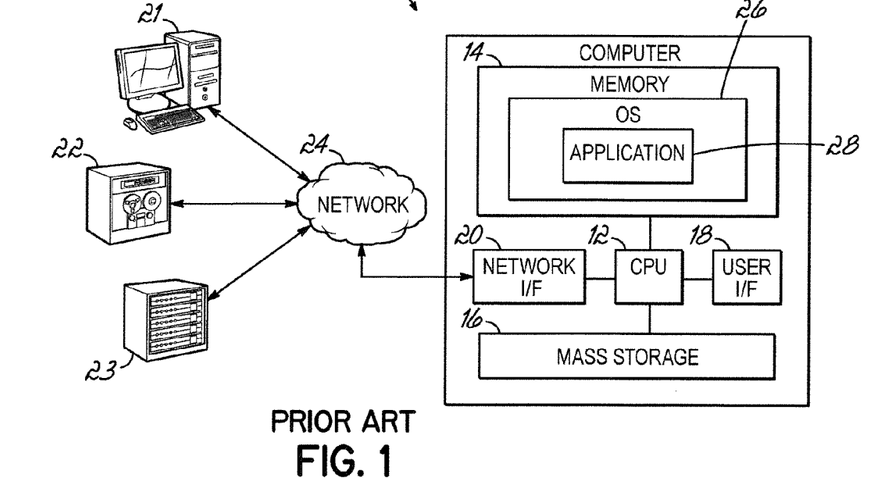
FIG. 1 is a diagram of one embodiment of a computer system environment in accordance with prior art and suitable for use in one or more embodiments of the present invention.

Turning to the drawings, wherein like numbers denote like parts throughout the several views, FIG. 1 illustrates a hardware and software environment for a computing system 10 that may include an integrated circuit device (hereinafter "ICD") consistent with embodiments of the invention. The computing system 10, for purposes of this invention, may represent any type of computer, computer system, computing system, server, disk array, or programmable device such as multi-user computers, single-user computers, handheld devices, networked devices, etc. The computing system 10 may be implemented using one or more networked computers, e.g., in a cluster or other distributed computing system. The computing system 10 will be referred to as "computer" for brevity sake, although it should be appreciated that the term "computing system" may also include other suitable programmable electronic devices consistent with embodiments of the invention.

The computer 10 typically includes at least one processing unit 12 (illustrated as "CPU") coupled to a memory 14 along with several different types of peripheral devices, e.g., a mass storage device 16, a user interface 18 (including, for example, user input devices and a display), and a network interface 20. The memory 14 may be comprised of dynamic random access memory (DRAM), static random access memory (SRAM), non-volatile random access memory (NVRAM), persistent memory, flash memory, at least one hard disk drive, and/or another digital storage medium. The mass storage device 16 is typically at least one hard disk drive and may be located externally to the computer 10, such as in a separate enclosure or in one or more networked computers 21, one or more networked storage devices 22 (including, for example, a tape drive), and/or one or more other networked devices 23 (including, for example, a server). The computer 10 may communicate with the networked computer 21, networked storage device 22, and/or networked device 23 through a network 24. As illustrated in FIG. 1, the computer 10 includes one processing unit 12, which, in various embodiments, may be a single-thread, multithreaded, multi-core, and/or multi-element processing unit as is well known in the art. In alternative embodiments, the computer 10 may include a plurality of processing units 12 that may include single-thread processing units, multithreaded processing units, multi-core processing units, multi-element processing units, and/or combinations thereof as is well known in the art. Similarly, memory 14 may include one or more levels of data, instruction and/or combination caches, with caches serving an individual processing unit or multiple processing units as is well known in the art. In some embodiments, the computer 10 may also be configured as a member of a distributed computing environment and communicate with other members of that distributed computing environment through the network 24.

The memory 14 of the computer 10 may include an operating system 26 to control the primary operation of the computer 10 in a manner that is well known in the art. In a specific embodiment, the operating system 26 may be a Unix-like operating system, such as Linux. The memory 14 may also include at least one application 28, or other software program, configured to execute in combination with the operating system 26 and perform a task. It will be appreciated by one having ordinary skill in the art that other operating systems may be used, such as Windows, MacOS, or Unix-based operating systems, for example, Red Hat, Debian, Debian GNU/Linux, etc.

In general, the routines executed to implement the embodiments of the invention, whether implemented as part of an operating system 26 or a specific application 28, component, algorithm, program, object, module or sequence of instructions, or even a subset thereof, will be referred to herein as "computer program code" or simply "program code." Program code typically comprises one or more instructions that are resident at various times in memory and storage devices in a computer, and that, when read and executed by at least one processor in a computer, cause that computer to perform the steps necessary to execute steps or elements embodying the various aspects of the invention. Moreover, while the invention has been, and hereinafter will be, described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others, and transmission-type media such as digital and analog communications links.

In addition, various program code described hereinafter may be identified based upon the application or software component within which it is implemented in specific embodiments of the invention. However, it should be appreciated that any particular program nomenclature that follows is merely for convenience; and thus, the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, Application Programming Interfaces [APIs], applications, applets, etc.), it should be appreciated that the invention is not limited to the specific organization and allocation of program functionality described herein.

Those skilled in the art will recognize that the environment illustrated in FIG. 1 is not intended to limit the present invention. Indeed, those skilled in the art will recognize that other alternative hardware and/or software environments may be used without departing from the scope of the invention.

With the computing system described in some detail, an exemplary physical system to be modeled is described. The system to be modeled and simulated includes an etching apparatus described in the plasma model and can be a DF-CCP etching system such as those taught in U.S. Pat. Nos. 5,997,962; 6,426,477; and 6,576,860 each incorporated herein by reference in its entirety; however, the necessary details will be described specifically herein. This system is selected because its nominal complexity renders it suitable for illustration purposes. It should be understood that the principles described herein are applicable to a wide variety of other plasma processing systems. Other examples of plasma processing systems and plasma sources that are described with the aid of computer simulations are described in U.S. Pat. Nos. 7,273,533 and 6,523,493 and U.S. Patent Application Publication No. US2005/0160985, each expressly incorporated by reference herein in its entirety.

Figure 2:
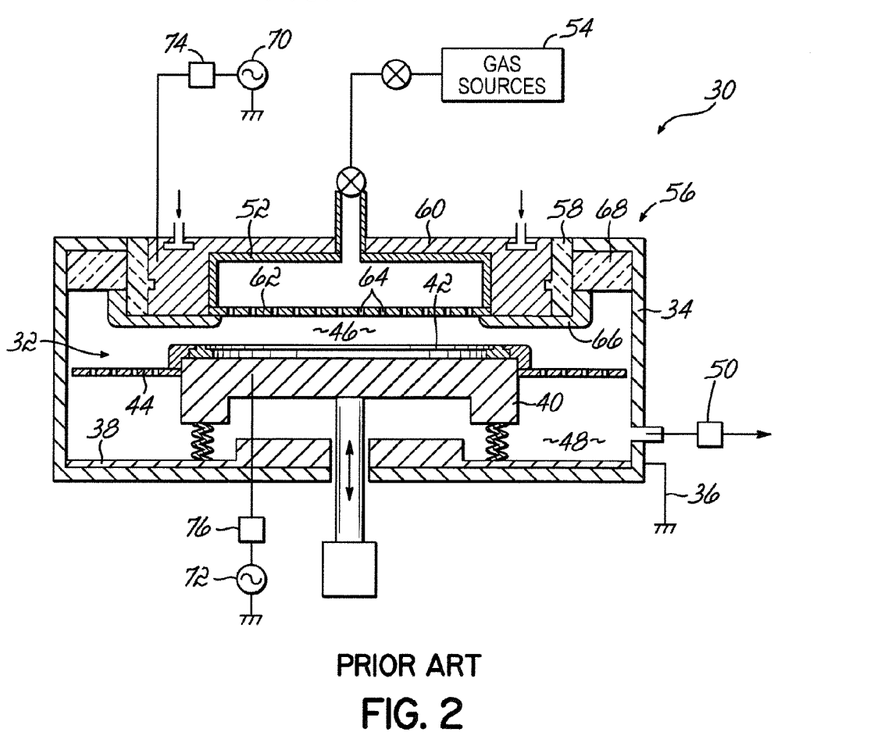
FIG. 2 is a cross-sectional diagram of one embodiment of a DF-CPP etching system in accordance with prior art and suitable to be modeled in accordance with one or more embodiments of the invention.

FIG. 2 schematically illustrates the basic components of a representative DF-CCP system 30, which includes a process chamber 32 formed within a container 34 constructed from conductive material, such as aluminum having an oxidized alumite surface. The container 34 is grounded through a ground line 36. A support plate 38 formed of an insulating material is arranged on the bottom of the process chamber 32. A wafer support 40 is arranged on the insulating support plate 38 and is operable to hold the wafer 42 to be etched. The wafer support 40 also acts as a lower electrode.

The wafer support 40 is made of aluminum having an oxide surface and can include several features, such as heating and chilling elements (not shown).

The wafer support 40 is surrounded by a baffle plate 44 arranged around the wafer support 40. An inner portion of the baffle plate 44 is affixed to the wafer support 40. The baffle plate 44 serves to facilitate the uniform flow of process gas from a processing volume 46 of the process chamber 32 above the wafer 42 to an exhaust volume 48 in the lower portion of the process chamber 32 from which it is exhausted by an exhaust pump 50.

A shower head 52 is arranged at the top of the process chamber 32 for introducing a gas from a gas source 54. The shower head 52 is attached to the ceiling 56 of the process chamber 32 through an insulating support 58 made of alumina and a cooling member 60 made of aluminum. An upper electrode 62 is fixed to the bottom of the shower head 52 and is made of a conductive material, such as single crystalline silicon. The upper electrode 62 serves as the outlet plate of the shower head 52 and includes a plurality of delivery holes 64 through which a gas within the shower head 52 can be delivered into the process chamber 32 above the wafer 42 on the wafer support 40. The upper electrode 62 should be approximately the same in size as the lower electrode (represented by the wafer support 40).

The process chamber 32 further includes a shield ring 66 near the upper electrode 62 and made of an insulating material such as quartz. A second insulating ring 68 can be made of a fluoride-based resin and positioned between the top of the shield ring 66 and ceiling 56 of the process chamber 32. Generally, the frequency of the RF for the upper electrode 62 should be much greater than the frequency of the RF to the lower electrode (represented by the wafer support 40).

The upper electrode 62 and the lower electrode (represented by the wafer support 40) are each respectively connected to individual power sources or RF power supplies 70, 72. Each RF power supply is respectively connected through a matching network 74, 76 to the upper electrode 62 and the lower electrode (represented by the wafer support 40). Generally, the RF power supply 72 for the lower electrode will operate at a lower frequency, such as 2 MHz (from about 1 MHz to about 5 MHz). The RF power supply 70 for the upper electrode 62 will operate at a higher frequency, such as 100 MHz (from about 10 MHz to about 200 MHz).

The DF-CCP system 30 includes a control system (not shown) operable to govern the RF power supplies 70, 72 and to operate the other sub-systems of the system 30 to perform a plasma etch process on the wafer 42.

In operation, the DF-CCP system 30 will generate a capacitively coupled plasma in the processing volume 46 for etching the wafer 42 upon the wafer support 40 according to a first embodiment of the present invention by which, for example, an oxide film such as $SiO_2$ is etched on the wafer 42.

In performing an etching process in the DF-CCP system 30, a wafer 42 is positioned upon the wafer support 40 and the processing volume 46 is set to a predetermined vacuum. One or more process gases, including Ar, $N_2$, $CF_4$ and others, is supplied from the gas source 54 at a predetermined flow rate. The one or more process gases are exhausted at the exhaust volume 48 by the vacuum exhaust pump 50. Typical pressures are in the range of from 1 to 20 mTorr (up to about 300 mTorr).

After the vacuum is established, the upper electrode 62 is supplied with an RF energy having a frequency of 100 MHz and a power of, e.g., 2 kW from the RF power supply 70. The lower electrode (represented by the wafer support 40) is supplied with an RF energy having a frequency of 2 MHz and a power of, e.g., 1 kW from the RF power supply 72. The RF power applied to the upper electrode 62 generates a plasma between the upper electrode 62 and the wafer support 40, while the RF power to the lower electrode (represented by the wafer support 40) provides a self-bias on the wafer 42 for directing the etchant ions within the plasma onto the wafer 42. This combination of lower and higher frequency RF energies creates an immediate and stable plasma.

Within the plasma, electrons are energized by the high frequency RF field. As the high energy electrons diffuse through the plasma, the high energy electrons will undergo non-elastic collisions with molecules of the process gas. These collisions can result in the generation of radicals, cations, and/or anions by the dissociation of the process gas wherein the generating of these species will depend on the particular gas, the energy of the high energy electrons, and the number of collisions occurring between electrons and a particular gas molecule. Additionally, a portion of the dissociated radicals, anions, and cations may undergo recombination into the process gas molecules.

Cation etchant ions of gas from the plasma are attracted by a negative bias on the wafer support 40 such that the cation etchant ions are incident onto the wafer 42. As a result, the silicon oxide ($SiO_2$) film on the surface of the wafer 42 can be etched at a uniform etching rate that is determined in part by the composition, density, and distribution of the plasma in the processing volume 46, and physical parameters such as the geometric, electric, and chemical parameters of the process chamber 32 and the DF-CCP system 30.

When the etching is complete, the controller stops the supply of RF energy to the upper electrode 62 and the wafer support 40, and stops the supply of the process gas into the process chamber 32, whereupon the wafer 42 can be removed from the process chamber 32.

Existing between the plasma and the upper and lower electrode there is a plasma sheath. The plasma sheath properties are usually considered to be a vacuum.

While the basic components of the DF-CCP system 30 have been described in some detail, it would be understood than additional features or geometries could be included within the simulation model.

With the DF-CCP system 30 now described with some detail, the simulation according to an embodiment of the present invention for modeling of the distribution and other parameters of the plasma, and the computer method for such modeling, will now be described. The plasma to be simulated is specified in a mathematical coordinate system called the simulation domain. The simulation domain used herein is two-dimensional and is constructed with axial symmetry; however, multiple dimension systems are also possible. The plasma, for example, can be modeled in a manner described by Lee et al., "Modeling electromagnetic effects in capacitive discharges," *Plasma Sources Sci. Technol.* 17, 1-16 (2008), incorporated herein by reference in its entirety.

The program code to simulate the plasma may be executed as part of, or executed on behalf of, a software suite, application, command, or request. In some embodiments, the program code may be incorporated with, or executed on behalf of, device simulation software. In a specific embodiment, the program code may be incorporated with, or executed on behalf of, a version of COMSOL application/software suite as distributed by The COMSOL Group of Burlington, Mass. In alternative embodiments, the program code may be incorporated with, or executed on behalf of, mathematical software, such as a version of Fluent by ANSYS Corp or Mathematica by Wolfram Research, Inc.

Figure 3:
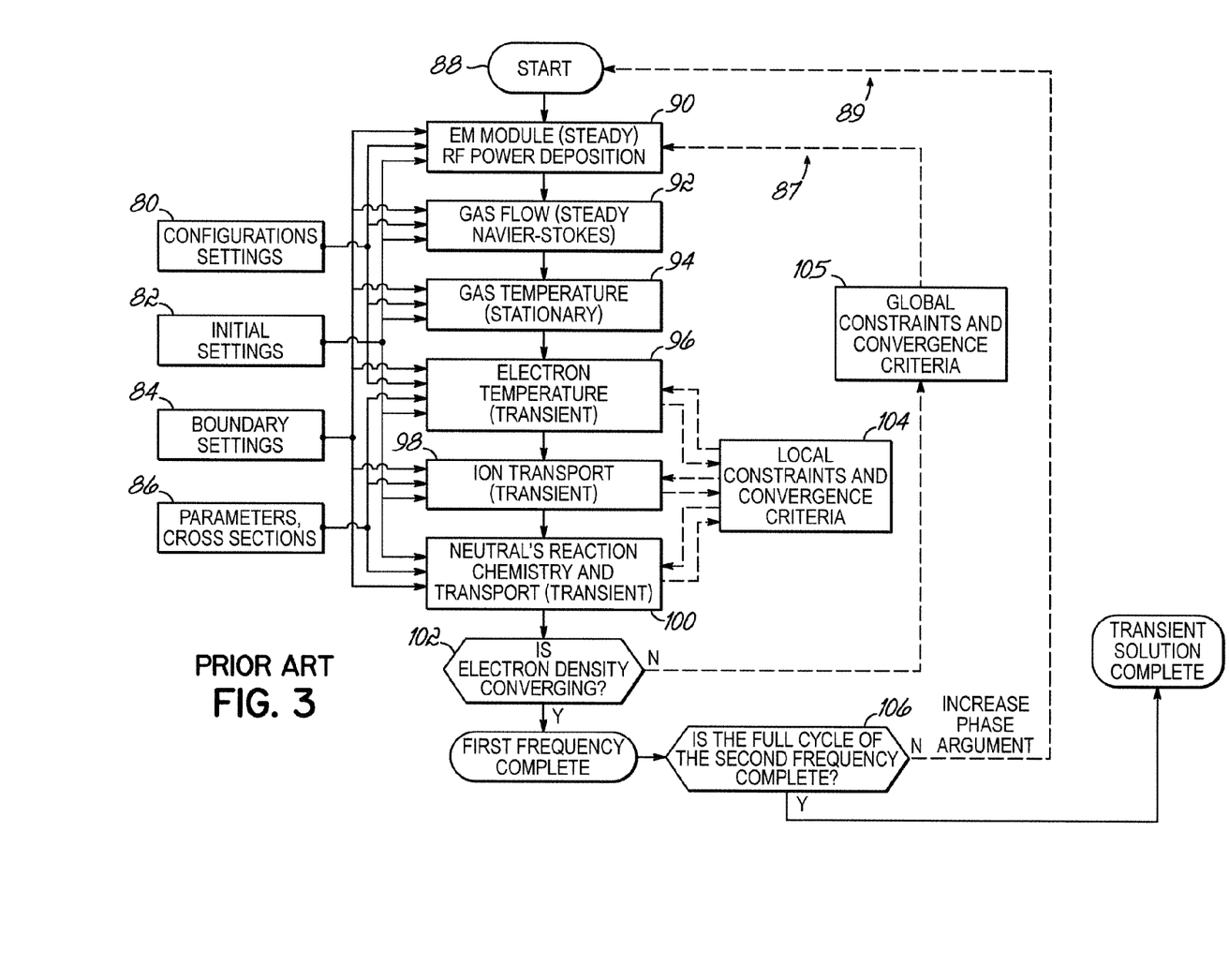
FIG. 3 is a flow chart and information flow diagram of a simulation or modeling process for solving the transient plasma density distribution in a plasma processing system such as, for example, the DF-CCP etching system of FIG. 2 and in accordance with prior art.

The conventional transient method of modeling the plasma is shown in FIG. 3. This method can, for example, model transient behavior that leads to steady state solutions of various plasma properties. To begin the method, and in accordance with steps 80, 82, 84 and 86, configuration settings, initial conditions, boundary conditions, and parameters of the etching system are entered into the start of the simulation program. These initial parameters and settings are utilized within various subsequent steps as shown.

After the simulation domain and initial parameters are set, the simulation begins at step 88, wherein the simulation domain is entered. This simulation domain involves solving the transient domain behavior for the time-based variables to arrive at a steady state solution of the plasma. In the DC-CCP system 30 (FIG. 2), this involves solving equations that describe the system for each of the time-based variables, which in the case of the system 30 (FIG. 2) are CCP power that has a first frequency of, for example, 100 MHz and the substrate bias power that has a second frequency of, for example, 2 MHz, in a series of nested loops.

The transient behavior based on the CCP power at the first frequency is iterated in a first and inner loop 87 over a time interval sufficient for convergence to a steady state solution, which for the 100 MHz frequency is found to be a time interval of from 0 to approximately 1-10 microseconds, in 0.1 nanosecond increments, for a total of about 10,000 to 100,000 iterations. The transient behavior based on the bias power at the 2 MHz frequency is iterated in a second and outer loop 89 over a time interval also deemed sufficient for convergence. Where the first frequency is much larger than the second frequency, this is found to be one complete cycle of 500 nanoseconds, calculated in 10 or 15 degree increments, for example, for twenty iterations of 25 nanosecond. The solution for the system 30 (FIG. 2) with the two time bases thus requires about 250,000 to 2,500,000 iterations that each involves solving of all of the equations describing the system.

Execution of the inner loop 87 begins with calculating the RF power deposition within the plasma as in step 90, using the configuration settings (Block 80), the initial settings (Block 82), and the boundary conditions (Block 84). One manner of calculating the RF power deposition is by an Electro-Magnetic solver for Maxwell Equations in a simple format having 2-D axial symmetry (i.e. electric field with components in the r-z plane and a magnetic field having only an azimuthal component). As such, the RF power deposition can be computed from:

$$\nabla \times \left( \left( \varepsilon_r - j\frac{\sigma}{\omega \varepsilon_0} \right)^{-1} \nabla \times H_\varphi \right) - \mu_r k_0 H_\varphi = 0 \qquad \text{EQUATION 1}$$

where $\epsilon_r$ is the relative permittivity in the sheath, j is the complex number index, $\sigma$ is the conductivity, $\omega$ is the RF excitation angular frequency, $\epsilon_0$ is the permittivity of free space, $H_\phi$ is the magnetizing field intensity, $\mu_r$ is the permeability, and $k_0$ is the wave number in vacuum given by $k_0 = \omega\sqrt{\epsilon_0 \mu_0} = \omega/c_0$, where $\omega$ is the angular frequency and $c_0$ is the speed of light. Solving for $H_\phi$ results in the electric field:

$$H_\phi \Rightarrow (E_r, E_z) \qquad \text{EQUATION 2}$$

and the RF power that is deposited into the plasma is calculated as:

$$Q_{abs} = \frac{1}{2}\sigma_p|E|^2 \qquad \text{EQUATION 3}$$

where $Q_{abs}$ is the heat absorbed from the RF field and $\sigma_p$ is the conductivity of the plasma.

Once the iteration step on the calculation of the radiofrequency field and power deposition is complete, the gas flow is calculated in step 92. This can be accomplished from steady state Navier-Stokes equations assuming a low Reynolds number and laminar flow in 2-D axial symmetry geometry. The total stress tensor formulation is given by:

$$\rho\frac{\partial \vec{u}}{\partial t} - \nabla \cdot [-p\vec{I} + \eta(\nabla\vec{u} + (\nabla\vec{u})^T)] + \rho(\vec{u}\cdot\nabla)\vec{u} = \vec{F} \qquad \text{EQUATION 4}$$

where $\rho$ is the gas density, $\vec{u}$ is the gas velocity, p is the process chamber pressure, $\vec{I}$ is the unit diagonal matrix, $\eta$ is the gas viscosity, and $\vec{F}$ are the body forces. The mass continuity equation under imcompressible gas assumption (that is with density being constant) will simplify to:

$$\nabla \cdot \vec{u} = 0 \qquad \text{EQUATION 5}$$

Turning now to iteration step 94, the temperature of the gas is calculated in accordance with energy conservation. As noted above, the gas molecules are heated (source term Q) due to the non-elastic collisions between gas molecules and RF field energized electrons. Thus, the gas temperature, $T_g$, is computed through a heat transport by a gas convection and heat conduction module:

$$\nabla(-k\nabla T_g) = Q - \rho c_p \vec{u} \nabla T_g \qquad \text{EQUATION 6}$$

where k is Boltzmann constant and $c_p$, $\rho$, and k are gas heat capacity, density, and thermal conductivity of the gas mixture, respectively.

With the gas flow and temperature calculated, the local time iterative scheme can begin at step 96. As noted above, the upper electrode is powered by a 100 MHz RF frequency, which corresponds to a 10 ns time scale. As a result, the iterations to simultaneously solve the equations of step 96 through step 100 occur at 0.1 ns intervals until a transient convergence of the intermediate values of the electron temperature, electron density, and radical densities is achieved. This iteration process can typically continue at about $10^{-4}$ second (or 100 μs) intervals within the internal time of the model. Specifically, the iterative calculations include the following steps and equations.

In step 96, the electron temperature ($T_e$) is computed in accordance with the conservation of energy:

$$\frac{\partial}{\partial t}\left(\frac{3}{2}n_e T_e\right) + \nabla\left(\frac{5}{2}T_e \Gamma_e - k\nabla T_e\right) = \qquad \text{EQUATION 7}$$
$$Q_{abs} - e\Gamma_e E_a - \frac{3m}{M}v_m n_e T_e - \sum_i V_i v_i n_e$$

where $E_a$ is an ambipolar electric field; $\Gamma_e$ is electron flux; $v_i$ is the collision frequency of the "i"-th reaction and $V_i$ is its threshold; e is the elementary charge; m is electron mass; and M is total mass of two particles in elastic collision.

In step 98, the electron (or ion) density is calculated by an ambipolar-drift diffusion approach, with a transient mass balance equation for "i" type of ions:

$$\frac{\partial n_i}{\partial t} + \nabla(-D_a \nabla n_i + n_i \vec{u}) = R_i \qquad \text{EQUATION 8}$$

Where $n_i$ is the "i"-th ion and $D_a$ is the ambipolar diffusion coefficient.

Finally, in step 100, the neutral species transport within the plasma is calculated from the mass balance equations:

$$\nabla(-D_k \nabla n_k + n_k \vec{u}) = R_k \qquad \text{EQUATION 9}$$

where $D_k$ is the diffusion coefficient of the "k"-th particle and $n_k$ is the "k" particle, and where k=all neutral species of the reaction. The generation and recombination of the positive etchant ions is given by:

$$R_k = n_e \sum_j n_j \langle \sigma_{jk} v_e \rangle + \qquad \text{EQUATION 10}$$
$$\sum_{j,l} R_{jkl} n_j n_l - n_e n_k \sum_j \langle \sigma_{kj} v_e \rangle - n_k \sum_{j,l} R_{kjl} n_l$$

where $n_e$ is the electron, $n_j$ is the "j" particle, $\sigma_{jk}$ and $\sigma_{kj}$ are the recombination rates due to collisions with electrons, $R_{jkl}$ (forward) and $R_{kjl}$ (backward) are the rate constants due to collision with species $n_k$ or $n_j$, and $v_e$ is the electron velocity.

As indicated above, iteration steps 90-100 are repeated at approximately 0.1 ns intervals until the transient solutions converge. Typically, the iterations involve calculations of steps 96-100 for electron temperature, electron density, and radical densities to converge. Convergence usually occurs within an internal model time of between 1 μs and 10 μs, at which time the iteration scheme computation proceeds to loop switch 102, which involves recalculation of all steps 90-100.

Throughout step 96 to step 100, the local constraints and convergence criteria of step 104 can be changed or adjusted to aid in the convergence of the mentioned parameters.

If convergence does not occur at step 102, the new iteration sequence will start again at Step 90 through Step 100 under the satisfaction of the global constraints and convergence criteria at step 105. The process begins again at step 90 with these new criteria.

When the electron density for the first frequency has converged, then the RF cycle at the second frequency is computed in the outer loop 89 at phase steps that are less than 5% of the RF cycle duration, that is phase modulated by 10° to 15° steps, with the process of steps 88 through 106 are repeated for each iteration of loop 89. Typically, steps 90 through 102 can take about 4 hours to about 6 hours to complete the coupled iteration scheme computation using a dual core PC at 2-3 GHz. Thus, a full transient solution for a dual frequency system can take nearly 100+ hours.

Figure 4A:
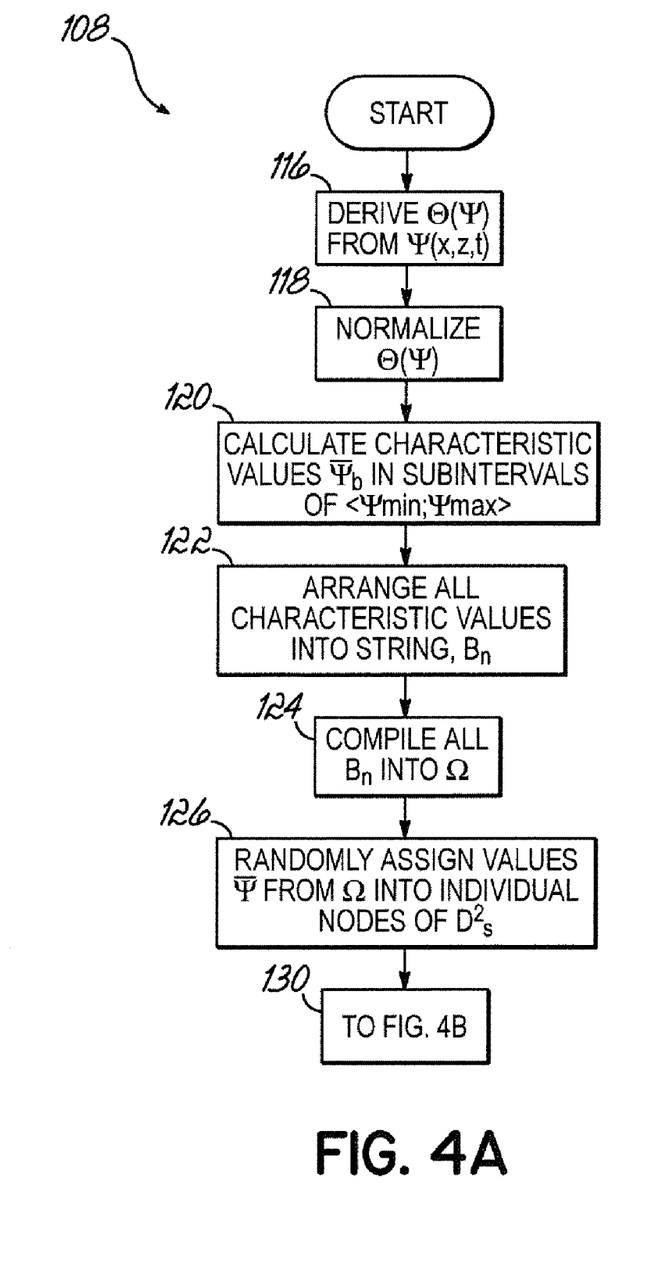
FIGS. 4A and 4B are flow charts of a simulation and modeling process using a stochastic transformation according to one embodiment of the present invention.

To decrease the computational time needed for achieving a solution, the transient model is converted to a stochastic model as generally shown in FIG. 4A and in accordance with the present invention.

Turning now to FIG. 4A, the method 108 begins with defining the simulation domain according to one embodiment of the present invention. The simulation domain defining the characteristics of the etching system will include time dependent variables that are dependent upon the chemicals, materials, or geometries of the plasma. Often, the simulation domain may contain at least one or more time dependent variables, or sub-domains for differing chemicals, materials, and/or geometries. That is, for each sub-domain, the time dependence of the variable in each point within the sub-domain should be a homogenous transient formulation, i.e. have similar time dependence differing only in phase for various points. Otherwise, the simulation domain is a heterogeneous transient solution and should be divided into two or more sub-domains of homogeneous transient formulations.

Figure 5:
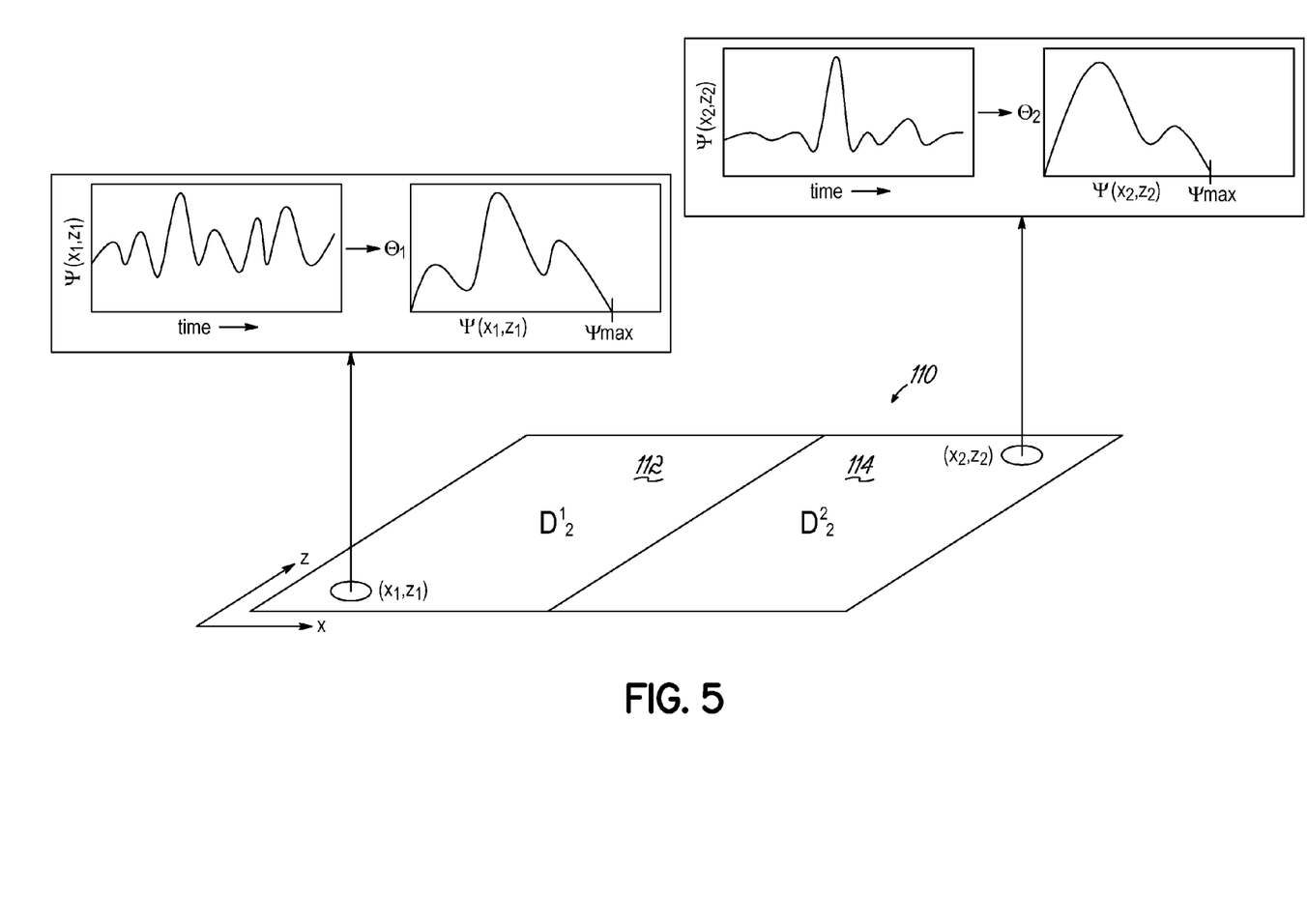
FIG. 5 is a schematic illustration of the transient character of the points within the simulation domain.

For example, as illustrated in FIG. 5, the simulation domain $D^2$ 110 can include points $(x_1, z_1)$ and $(x_2, z_2)$ shown to differ in their time dependence of a particular variable. Thus, points $(x_1, z_1)$ and $(x_2, z_2)$ will exist in first and second sub-domains $(D_2^1, D_2^2)$ 112, 114, respectively. While only two sub-domains $D_2^1$ and $D_2^2$ 112, 114 within the simulation domain $D^2$ 110 are shown, it would be understood that more sub-domains are possible.

A time dependent function, $\Psi$, for the time dependent variable of each sub-domain can be determined by empirical data or by analytical derivation and are represented by the graphs $\Psi$ versus time within FIG. 5.

Returning again to FIG. 4A, and specifically to Step 116 where a probability function $\Theta$ for each time dependent function, $\Psi$, is determined, wherein the probability function $\Theta$ is a statistical distribution of the values of $\Psi$. The probability function can be determined from the known analytical expression of the transient dependence of the particular variable by measured or empirically established transient dependence, hypothetically derived, or measured directly. As seen in FIG. 5, each $\Psi$ of a separate sub-domain may have a different statistical distribution shown in graphs $\Theta$ versus $\Psi$.

Continuing with FIG. 4A, and step 118, the probability function $\Theta$ is normalized to ensure that an occurrence of all transient values corresponds to the probability equal to 1. In other words, the probability function is multiplied by a normalizing constant, $\kappa$ according to:

$$\int_{\Psi^{min}}^{\Psi^{max}} \kappa \Theta(\Psi) d\Psi = 1 \qquad \text{EQUATION 11}$$

Figure 6:
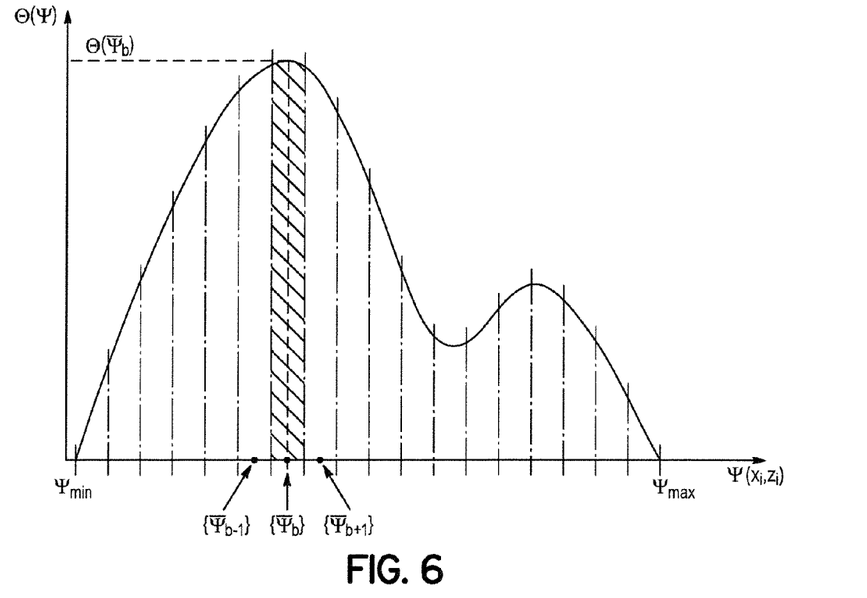
FIG. 6 is a schematic illustration of the characteristic values and the arrangement of the characteristic values into arrays, $B_n$.

This will ensure that the area under the $\Theta$ versus $\Psi$ curve (see FIG. 6) should be equal to 1. The normalized probability function will then be given by:

$$\Theta_{norm}(\Psi) = \kappa \Theta(\Psi), \text{ where } \kappa = \frac{1}{\int_{\Psi^{min}}^{\Psi^{max}} \Theta(\Psi) d\Psi} \qquad \text{EQUATION 12}$$

With the probability function now normalized, the method proceeds to step 120 of FIG. 4A with reference made to FIG. 6. In step 120, the interval of the function $\Psi$ values, that is $\langle \Psi_{min}, \Psi_{max} \rangle$ is subdivided into "n" subintervals $\langle \Psi_{min} : \Psi_{max} \rangle_{nks}$, wherein the size of each subinterval will be given by:

$$\Delta \Psi(x, z) = \frac{\Psi^{max}(x, z) - \Psi^{min}(x, z)}{n_{ks}} \qquad \text{EQUATION 13}$$

And the characteristic value, $\Psi_b$, is determined for each $n_{ks}$ sub-interval. The $\Psi_b$ can be mean value of $\Psi$ values between $\langle \Psi_{min} : \Psi_{max} \rangle$; however, other values may also be appropriate. Additionally, the subintervals should be sufficiently small to minimize sampling error. This is illustrated in FIG. 6, wherein the characteristic value $\Psi$ for subintervals $\Psi_{b-1}, \Psi_b,$ and $\Psi_{b+1}$ are shown.

Turning again to FIG. 4A, and specifically to Step 122, wherein the characteristic values $\Psi_b$ are arranged into corresponding strings, $B_n$, wherein the length of Bn is given by:

$$\Delta b = INT[n_{NS} n_{MS} \Theta_{norm}[\Psi_b(x,z)]] \qquad \text{EQUATION 14}$$

where $n_{NS}$ and $n_{MS}$ are the number of points within the simulation domain 110 in the x- and z-axes, respectively, and each member within the string will equal the value of $\Psi_b$.

Figure 7:
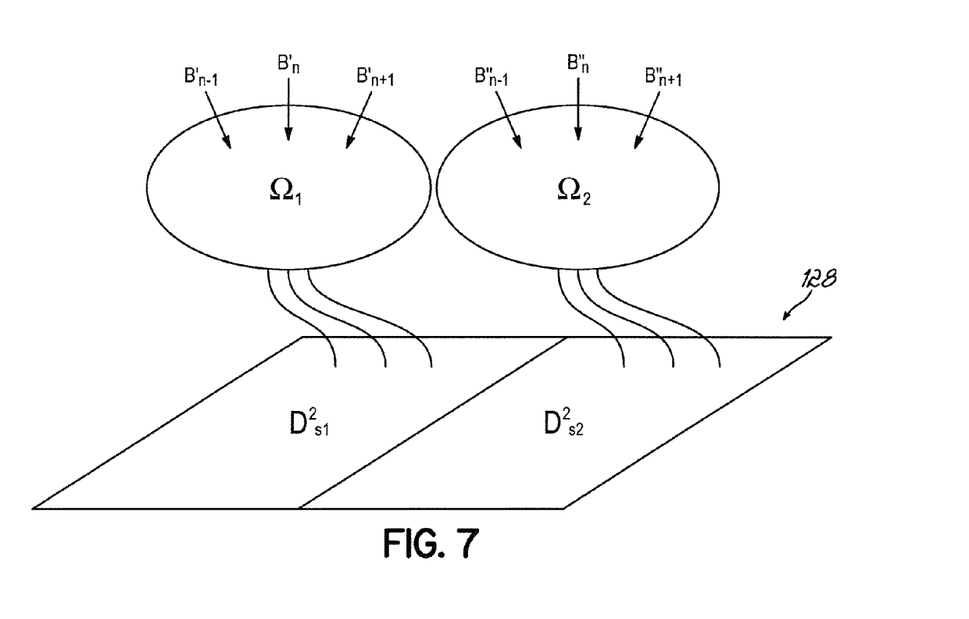
FIG. 7 is a schematic illustration of the random sampling of $\Omega$ for each sub-domain within the stochastic simulation domain.

In step 124, all strings of $B_n$ are arranged into an array $\Omega$ corresponding to each sub-domain, as shown in FIG. 7.

In step 126 of FIG. 4A and further in FIG. 7, the values within each $\Omega$ are reassigned randomly into the points of the corresponding sub-domain. Once all of the points of the original simulation domain are randomly reassigned values from the respective $\Omega$, then the resultant array is a stochastic simulation array 128 and is ready to undergo simulation, as described in FIG. 4B.

Figure 4B:
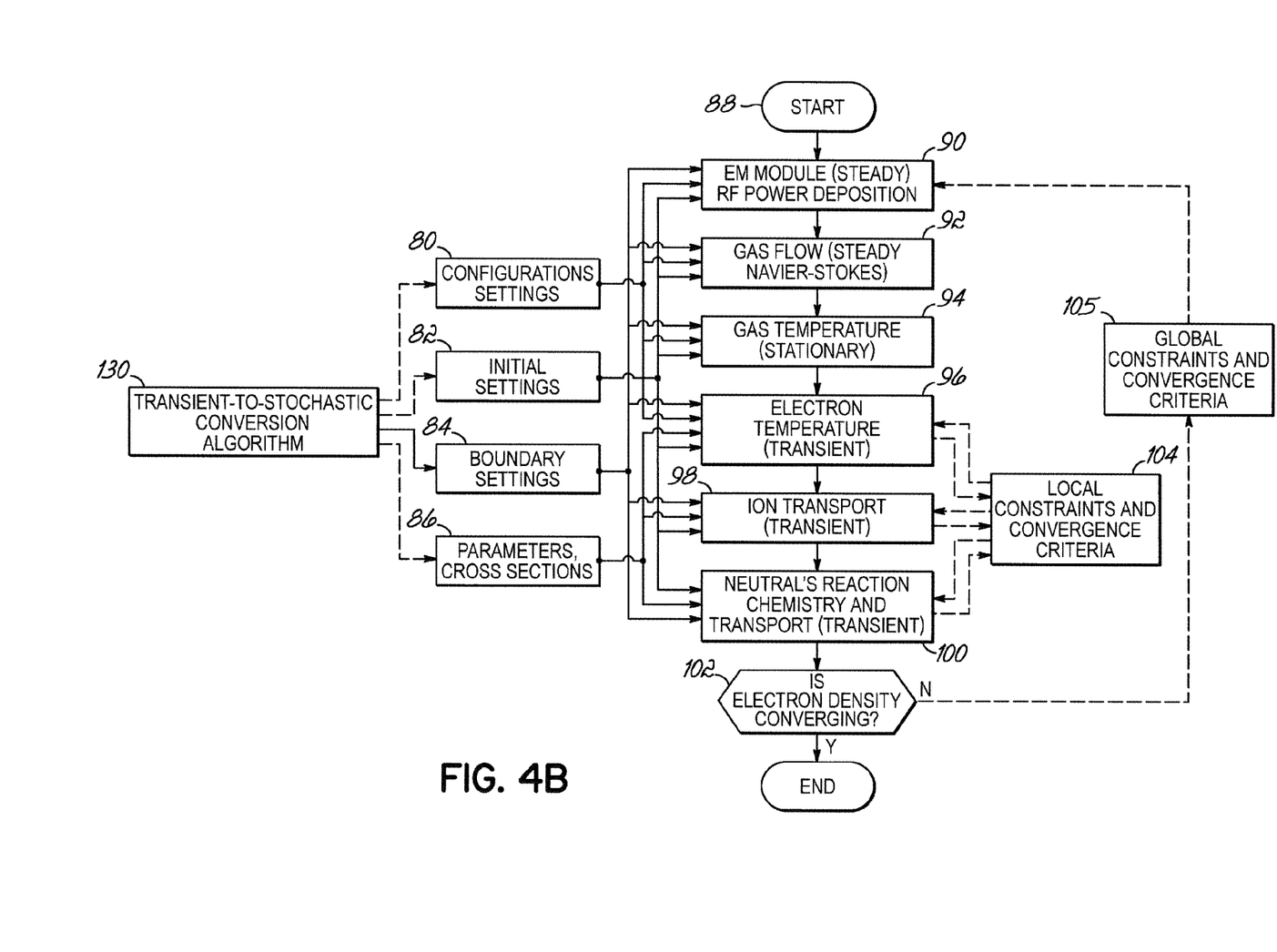

FIG. 4B illustrates the simulation of the DF-CCP device with the stochastic simulation array 128 created from step 130 (FIGS. 4A and 4B). While the majority of the simulation method is similar to what was detailed previously with FIG. 3, distinct differences will be noted. Most notably is the use of the stochastic simulation array eliminates the need for the super-loop or outer loop 89 (FIG. 3) with a phase-modulation at the second frequency in the iterative scheme Described herein is a method and an algorithm for converting a transient to spatial stochastic formulation for enhancing the computation of plasma fluid models. The computer method may be encoded on a computer usable medium and provided in the form of a computer program product. The system of FIG. 1, when programmed with the computer program product, is a simulation apparatus that includes a calculating unit programmed to calculate a probability function as described in connection with FIG. 4A and a simulation unit programmed to perform a simulation of transient plasma sheath behavior as described in connection with FIG. 4B.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A computer method for simulating plasma density distribution within a plasma reactor that is responsive to a first variable having a first time basis and a second variable having a second time basis, wherein the first time basis is different from the second time basis the computer method comprising executing computer program codes according to a process comprising:
   approximating a steady state of a transient sheath behavior of a plasma occurring in the plasma reactor in response to the first variable, the approximating including:
      defining a model domain that is characteristic of the plasma reactor;
      determining a response function of a time dependent variable across the model domain with respect to the second time basis;
      constructing a probability function for the response function;
      randomly sampling the probability function; and transferring the random sampling into a spatial matrix representing the steady state; and performing, on the spatial matrix, a time-domain simulation of the transient plasma sheath behavior occurring in the plasma reactor in response to the first variable to arrive at a steady state plasma density distribution.

2. The computer method of claim 1, wherein the first variable is a first power coupled to the plasma and operating at a first frequency, and the second variable is a second power coupled to the plasma and operating at a second frequency.

3. The computer method of claim 1, wherein defining the model domain includes establishing at least one initial value and at least one boundary condition for the model domain.

4. The computer method of claim 2, wherein the first frequency is greater than the second frequency.

5. The computer method of claim 4, wherein the first frequency ranges from 10 MHz to 200 MHz and the second frequency ranges from 1 MHz to 5 MHz.

6. The computer method of claim 1, wherein defining the model domain includes determining at least one characteristic of an electromagnetic effect of the plasma within the plasma reactor.

7. The computer method of claim 1, wherein defining the model domain includes at least two dimensions.

8. The computer method of claim 1, wherein randomly sampling includes calculating a character value of each random sampling.

9. The computer method of claim 8, wherein transferring the random sampling includes a randomly generated union of the character values.

10. The computer method of claim 1, wherein performing the time-domain simulation further comprises:
simulating non-elastic collisions and the diffusion of at least one particle within the plasma.

11. The computer method of claim 2, wherein the first frequency is a radiofrequency.

12. The computer method of claim 2, wherein:
the first power is a radiofrequency power provided by a plasma-generating antenna;
the second power is a biasing voltage provided by a biasing electrode; and
the time dependent variable is at least one of a particle velocity, a particle distribution, or a particle angular momentum.

13. A method of operating a plasma reactor, the method comprising:
(a) igniting a plasma within the plasma reactor with a dual frequency power supply having a first variable with a first time basis and a second variable at a second time basis, the dual frequency power supply operably controlled by a controller;
(b) processing at least one wafer with the plasma in accordance with a processing recipe;
(c) extinguishing the plasma;
(d) simulating the plasma reactor with the controller over the first time basis by:
(i) defining a model domain representative of the plasma reactor and including a profile of the processed at least one wafer;
(ii) determining a response function of a time-dependent variable across the model domain with respect to the second time basis;
(iii) constructing a probability function for the response function;
(iv) randomly sampling the probability function to define a plurality of character values;
(v) generating a spatial matrix from a randomly-generated union of the plurality of character values; and
(vi) performing, on the spatial matrix, a time-domain simulation of the transient plasma sheath behavior occurring in the plasma reactor in response to the first time basis to arrive at a steady state plasma density distribution; and
(e) adjusting the processing recipe in accordance with the arrived steady state plasma density before further processing.

14. The method of claim 13, wherein the first variable is a first power coupled to the plasma and operating at a first frequency, and the second variable is a second power coupled to the plasma and operating at a second frequency.

15. The method of claim 13, wherein defining the model domain includes establishing at least one initial value and at least one boundary condition for the model domain.

16. The method of claim 14, wherein the first frequency of the dual frequency power supply is greater than the second frequency of the dual frequency power supply.

17. The method of claim 16, wherein the first frequency of the dual frequency power supply ranges from 10 MHz to 200 MHz and the second frequency of the dual frequency power supply ranges from 1 MHz to 5 MHz.

18. The method of claim 13, wherein defining the model domain includes determining at least one characteristic of an electromagnetic effect of the plasma within the plasma reactor.

19. The method of claim 13, wherein defining the model domain includes at least two dimensions.

20. The method of claim 13, wherein randomly sampling includes calculating a character value of each random sampling.

21. The method of claim 20, wherein transferring the random sampling includes a randomly generated union of the character values.

22. The method of claim 13, wherein performing the time-domain simulation further comprises:
simulating non-elastic collisions and the diffusion of at least one particle within the plasma.

23. The method of claim 14, wherein the first frequency is a radiofrequency.

24. The method of claim 14, wherein:
the first power is a radiofrequency power provided by a plasma-generating antenna;
the second power is a biasing voltage provided by a biasing electrode; and
the time dependent variable is at least one of a particle velocity, a particle distribution, or a particle angular momentum.

* * * * *

UNITED STATES PATENT AND TRADEMARK OFFICE
CERTIFICATE OF CORRECTION

| | | |
|---|---|---|
| PATENT NO. | : 8,103,492 B2 | |
| APPLICATION NO. | : 12/248554 | |
| DATED | : January 24, 2012 | |
| INVENTOR(S) | : Jozef Brcka | |

It is certified that error appears in the above-identified patent and that said Letters Patent is hereby corrected as shown below:

Cover page, Col. 2, OTHER PUBLICATIONS, second line of first reference, "Coupled Singe- and" should read --Coupled Single- and--.

Page 2, Col. 1, OTHER PUBLICATIONS, first line of second reference, "capacitviley" should read --capacitively--.

Col. 1, line 37, "depends on" should read --depend on--.

Col. 1, line 50, "play in an" should read --play an--.

Col. 1, line 63, "capable for" should read --capable of--.

Col. 8, line 64, EQUATION 2, "$H_\Phi \Rightarrow (E_n E_z)$" should read --$H_\varphi \Rightarrow (E_n E_z)$--.

Col. 10, line 53, "106 are repeated" should read --106 is repeated--.

Col. 11, line 66, "characteristic value" should read --characteristic values--.

Col. 12, Claim 1, line 54, "second time basis the" should read --second time basis, the--.

Signed and Sealed this
Third Day of April, 2012

David J. Kappos
*Director of the United States Patent and Trademark Office*